United States Patent

[11] 3,625,887

| [72] | Inventors | Heyman C. Duecker<br>Rockville;<br>Harry C. Helmlinger, Jr., Baltimore, both of Md. |
|---|---|---|
| [21] | Appl. No. | 713,309 |
| [22] | Filed | Mar. 15, 1968 |
| [45] | Patented | Dec. 7, 1971 |
| [73] | Assignee | W. R. Grace & Co.<br>New York, N.Y. |

[54] NONCAKING UREA COMPOSITION CONTAINING ASBESTOS, ALUMINA OR SILICA HAVING AN ULTIMATE PARTICLE SIZE OF 2–20 MICRONS AND THE METHOD OF PREPARATION
6 Claims, No Drawings

[52] U.S. Cl................................................. 252/1,
71/28, 71/62, 239/2, 260/555 C
[51] Int. Cl........................................................C07c127/00,
C09k 3/00

[50] Field of Search............................................. 252/1;
260/555 C; 71/28, 62, 63; 34/10, 22, 57; 239/2

[56] References Cited
UNITED STATES PATENTS

| 3,116,185 | 12/1963 | Wilson | 260/555 X |
| 3,137,565 | 6/1964 | Hayes | 71/62 X |
| 3,249,441 | 5/1966 | Reynolds | 71/28 X |
| 3,322,827 | 5/1967 | James | 260/555 |
| 3,328,160 | 6/1967 | Boukidis | 71/62 |
| 3,329,418 | 7/1967 | Stephanoff | 34/57 |
| 3,360,870 | 1/1968 | Stephanoff | 34/57 |
| 3,475,132 | 10/1969 | Seifert | 71/28 X |

*Primary Examiner*—John T. Goolkasian
*Assistant Examiner*—M. E. McCamish
*Attorney*—Kenneth E. Prince

ABSTRACT: A fine-sized noncaking urea is prepared by feeding urea into a fluid energy mill under low moisture conditions.

NONCAKING UREA COMPOSITION CONTAINING ASBESTOS, ALUMINA OR SILICA HAVING AN ULTIMATE PARTICLE SIZE OF 2-20 MICRONS AND THE METHOD OF PREPARATION

This invention relates to finely divided urea and to an improved method of preparing the same. More particularly the invention relates to a method of preparing noncaking, finely divided urea suitable for use in fertilizer applications, weather modification and as a raw material in chemical reactions.

Urea is extensively used in agriculture as a fertilizer, but is well known to have caking tendencies causing obvious difficulties in storage. Recent interest has also been developed in the application of urea to the field of weather control. See, National Science Foundation, Weather Modification, 7th and 8th Annual Reports, June 30, 1965 and June 30, 1966, respectively.

By the present invention, it has now been discovered that a finely divided, noncaking urea can be prepared by providing a moving body of particulate urea suspended in a gaseous medium having a low-water content at superatmospheric pressure and a temperature below about 100° F., continuously introducing additional fluid in a plurality of high velocity streams directly inwardly into said body in a manner to cause extreme turbulence in the mass and resulting attrition and fracturing of the suspended particles, continuously removing the comminuted urea from the body along with the gaseous medium, and separating the finely divided urea particles from the suspending gas. Suitable apparatus for carrying out the process is known in the art Such apparatus is commonly known as a fluid energy mill. In this apparatus, relatively large particulate material is suspended in a gaseous medium whirling around in an enclosed space and additional gases are introduced into the whirling body in a manner causing turbulence within the body and comminution and fracturing of the particles by attrition. A complete description of such apparatus and its mode of operation can be found in Perry's Chemical Engineer's Handbook, Fourth Edition (1963), on pages 8-43, which is incorporated herein in its entirety by reference thereto.

In another embodiment of this invention the particulate urea is milled with another material chosen from the group consisting of clay, alumina, silica, and asbestos. The blend of urea and the other material can contain from 99.75 to 0.25 percent urea and from 0.25 to 99.75 of the other material. A preliminary comminution is required to reduce the size of the urea to about 0.25 to 0.08 inch or less, but this comminution is required only in order to permit feeding of the urea to the comminution apparatus. In the operation of the fluid energy mill, air is the preferred gaseous suspending medium, and is also the preferred supplemental turbulence-creating gas. Suitable pressures of the suspension air range from about 100 to about 500 (preferably about 100 to 300) pounds per square inch gauge, (p.s.i.g.) while the auxiliary turbulence-creating air is injected into the whirling body of particulate urea and optionally fine-size silica or clay at pressures which can range from about 100 to about 500 p.s.i.g., and preferably are between about 180 and about 200 p.s.i.g. The operable air temperature is less than about 100° F., while the preferred temperature is that of the ambient surroundings. The end product, either fine-sized urea or a fine-sized urea-silica (or clay, asbestos, or alumina) mixture can be separated from the suspending air in any suitable manner, for example, a cyclone system or a bag collector.

In order to provide a noncaking urea product, we have also found that the air used to create the turbulence can be treated by known means to reduce the water vapor contained therein. When the turbulence-creating air has a dew point of less than 20° F., and preferably −10° F. or below, the fine-sized urea produced by the fluid energy mill is noncaking, even when no special precautions are taken to protect the urea from moisture in storage. The normal storage procedure is followed, which consists of using paper or plastic (polyethylene) bags.

If the urea is being comminuted in an extremely high humidity location, it is also desirable to smother the feed entrance to the mill with an inert or moisture-free gas, such as treated air, nitrogen, or the like.

The finely divided urea, urea-silica, urea-clay, urea-asbestos, and urea-alumina mixtures can be used as fillers, as adjuncts in insecticides, as additives, as precipitants for fogs in weather control, controlling precipitation from clouds, and for innumerable other purposes.

The invention is illustrated, but not limited by, the following specific examples.

EXAMPLE 1

Preparation of Finely Divided Urea

Crystalline urea (W. R. Grace & Co. crystal grade urea 46 percent nitrogen) having a density of 58 lb./cu. ft. and a particle size of less than about 0.25 inches, was fed through a venturi-type injector at 100 p.s.i.g. into a commercially available 0202 Jet-O-Mizer fluid mill at a rate of 150 grams per minutes. The grinding air was at room temperature, and at a pressure of 100 p.s.i.g. was injected into the whirling body of urea to create a turbulent mass in the fluid mill. The air had previously been treated to remove moisture; the dew point of the air used was −24° F. Fine particulate urea, 90 percent of which was 5-10 microns in diameter, was separated from the air stream in a cyclone. The fine-size urea had a density of 23 lb./cu. ft., and was placed in polyethylene bags and stored in normal conditions. After 3 months shelf storage, no caking was observed.

EXAMPLE 2

Preparation of an Intimate Mixture of Fine-Size Urea and Fine-Size Clay

The same procedure used in example 1 was followed, except that the fine-sized product was a mixture of 92 percent urea and 8 percent chabazite clay. The clay was fed simultaneously with the urea into the fluid energy mill. The product exhibited only slight caking tendencies after 3 months storage in polyethylene bags.

EXAMPLE 3

Preparation of an Intimate Mixture of Fine-Size Urea and Fine-Size Silica

The same procedure used in example 2 was followed, except that the mixture contained 8 percent of silica (Code 65, Davison Chemical Division of W. R. Grace & Co.).

EXAMPLE 4

Preparation of an Intimate Mixture of Fine-Size Urea and Fine-Size Silica

The same procedure used in example 3 was followed, except that the mixture contained 1 percent of silica (Syloid 266, manufactured by Davison Chemical Division of W. R. Grace Co.). The silica used contained 99.7 percent $SiO_2$, having a surface area of 330 m.²/gram, and a bulk density of 4.8 lb./cu. ft.

EXAMPLE 5

Preparation of an Intimate Mixture of Fine-Size Urea and Fine-Size Silica

The same procedure used in example 3 was followed, except that the mixture contained 5 percent of silica (Syloid 65, manufactured by the Davison Chemical Division of W. R. Grace & Co.). The silica used contained 99.7 percent $SiO_2$, having a surface area of 830 m²/grams, and a bulk density of 20 lb./cu. ft.

EXAMPLE 6

Preparation of an Intimate Mixture of Fine-Size Urea and Fine-Size Alumina

The same procedure used in example 5 was followed, except that alumina having a surface area of 400 m²/gram was used.

EXAMPLE 7

Preparation of an Intimate Mixture of Fine-Size Urea and Fine-Size Asbestos

The same procedure used in example 5 was followed, except that particulate fibrous asbestos was used.

We claim:

1. A noncaking composition which consists of an intimate mixture of about 0.25 to 99.75 percent of a member chosen from the group consisting of asbestos, alumina, and silica; and 99.75 to 0.25 percent of fine-sized urea, said urea prepared from particulate urea, said member having a particle size of about 2–20 microns and said urea having an ultimate particle size with a major dimension of about 2–20 microns.

2. The composition as defined in claim 1 in which said member's particle size is 7–15 microns and the urea particles have a major dimension of 7–15 microns.

3. The composition in claim 1 in which said member is silica.

4. The method for preparing an intimate mixture of a member chosen from the group consisting of asbestos, alumina, and silica having a particle size of about 2–20 microns; and fine-sized urea having a major dimension of about 2–20 microns, said mixture having from about 0.25 to 99.75 percent by weight of urea and from 99.75 to 0.25 percent by weight of said member comprising introducing particulate urea into the grinding chamber of a fluid energy mill, simultaneously introducing into said chamber said member whereby said urea is simultaneously comminuted and intimately mixed with said member and collecting said mixture thereby and collecting said mixture thereby produced.

5. The method as defined in claim 4 in which said member's particle size is about 7–15 microns and the urea particles have a major dimension of about 7–15 microns.

6. The method as defined in claim 4 in which said member is silica.

* * * * *

PO-1050
(5/69)

UNITED STATES PATENT OFFICE
CERTIFICATE OF CORRECTION

Patent No. 3,625,887          Dated December 7, 1971

Inventor(s) Heyman C. Duecker and Harry C. Helmlinger, Jr.

It is certified that error appears in the above-identified patent and that said Letters Patent are hereby corrected as shown below:

Column 4, Claim 4, Line 12; delete the words "and collecting said mixture thereby".

Signed and sealed this 16th day of May 1972.

(SEAL)
Attest:

EDWARD M. FLETCHER, JR.          ROBERT GOTTSCHALK
Attesting Officer                Commissioner of Patents